United States Patent
Leinaweaver et al.

(10) Patent No.: US 11,064,005 B2
(45) Date of Patent: *Jul. 13, 2021

(54) SYSTEM AND METHOD FOR CLUSTERED TRANSACTIONAL INTEROPERABILITY OF PROPRIETARY NON-STANDARD FEATURES OF A MESSAGING PROVIDER USING A CONNECTOR MECHANISM

(71) Applicant: Oracle International Corporation, Redwood Shores, CA (US)

(72) Inventors: John Leinaweaver, Aloha, OR (US); Jefferey Steidl, Portland, OR (US); Qiang Liu, Portland, OR (US); Dongbo Xiao, Edison, NJ (US); Lily He, Beijing (CN); Vivekananda Maganty, Portland, OR (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1043 days.

This patent is subject to a terminal disclaimer.

(21) Appl. No.: 13/872,899

(22) Filed: Apr. 29, 2013

(65) Prior Publication Data

US 2013/0290983 A1    Oct. 31, 2013

Related U.S. Application Data

(60) Provisional application No. 61/793,043, filed on Mar. 15, 2013, provisional application No. 61/793,257, (Continued)

(51) Int. Cl.
| | | |
|---|---|---|
| G06F 3/00 | (2006.01) | |
| G06F 9/44 | (2018.01) | |
| G06F 9/46 | (2006.01) | |
| G06F 13/00 | (2006.01) | |
| H04L 29/08 | (2006.01) | |
| G06F 9/54 | (2006.01) | |
| H04L 12/58 | (2006.01) | |
| G06F 8/30 | (2018.01) | |

(52) U.S. Cl.
CPC ............. H04L 67/00 (2013.01); G06F 8/30 (2013.01); G06F 9/541 (2013.01); G06F 9/546 (2013.01); H04L 51/06 (2013.01); H04L 67/1002 (2013.01); *G06F 2209/547* (2013.01)

(58) Field of Classification Search
CPC . G06F 8/30; G06F 9/541; G06F 9/546; G06F 2009/547
See application file for complete search history.

(56) References Cited

U.S. PATENT DOCUMENTS

6,578,191 B1    6/2003    Boehme et al.
6,738,975 B1    5/2004    Yee et al.
(Continued)

*Primary Examiner* — Diem K Cao
(74) *Attorney, Agent, or Firm* — Miller Nash LLP (57) ABSTRACT

A computer-controlled method of handling proprietary features in a messaging system includes receiving an object from a requesting application, determining that the object invokes proprietary features of a messaging system, accessing a wrapper library and wrapping the object in an appropriate wrapper for the messaging system to produce a wrapped object, the wrapper to preserve the proprietary feature, and transmitting the wrapped object to the messaging system.

6 Claims, 4 Drawing Sheets

Related U.S. Application Data filed on Mar. 15, 2013, provisional application No. 61/793,459, filed on Mar. 15, 2013, provisional application No. 61/800,016, filed on Mar. 15, 2013, provisional application No. 61/799,391, filed on Mar. 15, 2013, provisional application No. 61/639,786, filed on Apr. 27, 2012, provisional application No. 61/639,791, filed on Apr. 27, 2012.

(56) References Cited

U.S. PATENT DOCUMENTS

| | | |
|---|---|---|
| 6,922,695 B2 | 7/2005 | Skufca et al. |
| 6,996,565 B2 | 2/2006 | Skufca et al. |
| 7,003,773 B2 | 2/2006 | Hoennig et al. |
| 7,013,469 B2 | 3/2006 | Smith et al. |
| 7,017,162 B2 | 3/2006 | Smith et al. |
| 7,249,131 B2 | 7/2007 | Skufca et al. |
| 7,418,711 B1* | 8/2008 | Lee et al. ............ 719/314 |
| 7,472,400 B2 | 12/2008 | Luo et al. |
| 7,472,401 B2 | 12/2008 | Luo et al. |
| 7,506,342 B2 | 3/2009 | Mousseau et al. |
| 7,509,429 B2 | 3/2009 | Tankov et al. |
| 7,555,757 B2 | 6/2009 | Smith et al. |
| 7,644,184 B2* | 1/2010 | Arora et al. ............ 709/246 |
| 7,657,658 B2* | 2/2010 | Tankov ............ G06F 9/541 709/218 |
| 7,739,699 B2* | 6/2010 | Andreeva et al. ............ 719/330 |
| 7,752,484 B2* | 7/2010 | Goetz et al. ............ 714/2 |
| 7,930,704 B2 | 4/2011 | Mousseau et al. |
| 8,656,413 B2 | 2/2014 | Goetz |
| 8,695,015 B2* | 4/2014 | Borgendale ......... G06Q 10/107 709/205 |
| 2002/0031230 A1 | 3/2002 | Sweet et al. |
| 2002/0116454 A1 | 8/2002 | Dyla et al. |
| 2002/0144012 A1 | 10/2002 | Hoennig et al. |
| 2004/0006765 A1 | 1/2004 | Goldman |
| 2004/0015784 A1 | 1/2004 | Chidlovskii |
| 2004/0015974 A1 | 1/2004 | Jeyaraman |
| 2004/0019684 A1 | 1/2004 | Potter et al. |
| 2004/0098726 A1 | 5/2004 | Currie et al. |
| 2004/0123048 A1 | 6/2004 | Mullins et al. |
| 2004/0172639 A1 | 9/2004 | Luo et al. |
| 2004/0205771 A1 | 10/2004 | Sudarshan et al. |
| 2005/0044197 A1 | 2/2005 | Lai |
| 2005/0060169 A1* | 3/2005 | Gangadharan ......... G06Q 10/10 709/249 |
| 2005/0210108 A1 | 9/2005 | Covert et al. |
| 2005/0267918 A1 | 12/2005 | Gatev et al. |
| 2005/0268276 A1 | 12/2005 | Tankov et al. |
| 2006/0161925 A1 | 7/2006 | Aikens et al. |
| 2006/0259517 A1 | 11/2006 | Urscheler et al. |
| 2008/0148292 A1 | 6/2008 | Goetz |
| 2008/0155320 A1 | 6/2008 | Goetz et al. |
| 2008/0249988 A1 | 10/2008 | Chaitanya et al. |
| 2009/0094316 A1 | 4/2009 | Chen et al. |
| 2009/0265704 A1 | 10/2009 | Branda et al. |
| 2009/0307229 A1 | 12/2009 | Kunti et al. |
| 2010/0115059 A1 | 5/2010 | Youill et al. |
| 2012/0102085 A1 | 4/2012 | Gretter |
| 2012/0331135 A1 | 12/2012 | Alon et al. |

* cited by examiner

SYSTEM AND METHOD FOR CLUSTERED TRANSACTIONAL INTEROPERABILITY OF PROPRIETARY NON-STANDARD FEATURES OF A MESSAGING PROVIDER USING A CONNECTOR MECHANISM

RELATED APPLICATIONS

This application claims benefit of provisional patent applications 61/639,786, and 61/639,791, both filed Apr. 27, 2012; and provisional patent applications 61/793,043, 61/793,257, 61/793,459, 61/800,016, and 61/799,391, all filed Mar. 15, 2013, all incorporated by reference herein their entirety.

This application is related to the following co-pending US Patent Application Nos, all filed Apr. 29, 2013, all incorporated by reference herein in their entirety:

Ser. No. 13/872,976, "SYSTEM AND METHOD FOR CLUSTERED TRANSACTIONAL INTEROPERABILITY OF MULTIPLE MESSAGING PROVIDERS USING A SINGLE CONNECTOR MECHANISM;"

Ser. No. 13/872,919, "METHOD FOR A CONNECTOR PROVIDING TRANSACTIONAL INTEROPERABILITY TO MULTIPLE MESSAGING PROVIDERS TO MULTIPLE APPLICATION SERVERS USING THE SAME IMPLEMENTATION;"

Ser. No. 13/872,797, "SYSTEM AND METHOD FOR A CONNECTOR BEING ABLE TO ADAPT TO NEWER FEATURES INTRODUCED TO A MESSAGING PROVIDER WITH ONLY CONFIGURATION CHANGES;" and Ser. No. 13/872,822, "DYNAMIC CODE GENERATION TO DYNAMICALLY CREATE AND DEPLOY MESSAGING PROVIDER-SPECIFIC WRAPPERS FOR A RESOURCE ADAPTER."

BACKGROUND

Enterprise information systems such as e-commerce systems, inventory management systems, etc., communicate with each other through messages. This systems are often implemented in JAVA™-based systems, and the messaging system is typically referred to as a JAVA™ Message Service (JMS) as part of the JAVA™ Platform, Enterprise Edition (JAVA™ EE).

Messaging is a form of loosely coupled distributed communication consisting of the exchange of messages between software components. The JMS acts as an intermediary between application servers to allow synchronous and asynchronous communications. The application servers act as JMS clients. In some instances, the JMS clients are producers/publishers when they create and send messages, in other instances, the JMS clients are consumers/subscribers when they receive messages. JMS providers implement the system either as implementations of interfaces specified in the standard JAVA™ JMS specification or as proprietary extensions to the standard JMS specification interfaces. They also typically provide APIs and adapters for use by non JAVA™ messaging oriented middleware.

JMS generally operates in either a point-to-point model, where messages are routed to an individual consumer that maintains a queue of "incoming" messages, built on a set of message queues, senders and receivers. Each message is addressed to a specific queue, and the receiving clients extract messages from the queues. Queues retain all messages sent to them until the messages are consumed or until the message expires. When JMS operates in a publish/subscribe model it supports publishing messages to a particular message topic. Subscribers may register interest in receiving messages on a particular topic. Neither the publisher nor the subscriber knows about each other.

In order to use JMS, the clients must have a JMS provider that can manage the sessions and queues. Beginning with JAVA™ EE versions 1.4, a JAVA™ Connector Architecture (JCA) became available. Nominally, the JCA was supposed to allow all application servers to interact with JMS providers without having to customize the interfaces. However, this has never really happened.

Even using a 'generic connector' such as that described in the related application, JMS providers may have proprietary features add after deployment of the JMS code, or may have proprietary features that are not taken into account with the generic connector. In most systems, this will require the JMS system code to be re-coded, recompiled and re-deployed to handle these proprietary features. This inflexibility results in a time-consuming and expensive process.

DETAILED DESCRIPTION OF THE EMBODIMENTS

Enterprise Information Systems (EIS) may consist of many different components, including application servers, web servers, messaging systems, databases, stand-alone computers running JAVA™ Virtual Machines, etc. The combinations are varied and nearly infinite. This discussion will focus on application servers and the messaging system. Messaging systems allow application servers to exchange messages to complete tasks, such as in e-commerce, inventory management, etc. Most systems employ the JAVA™ programming language because of its ability to run on all types of systems, and in turn, the EIS uses the JAVA™ Message Service (JMS).

Figure 1:
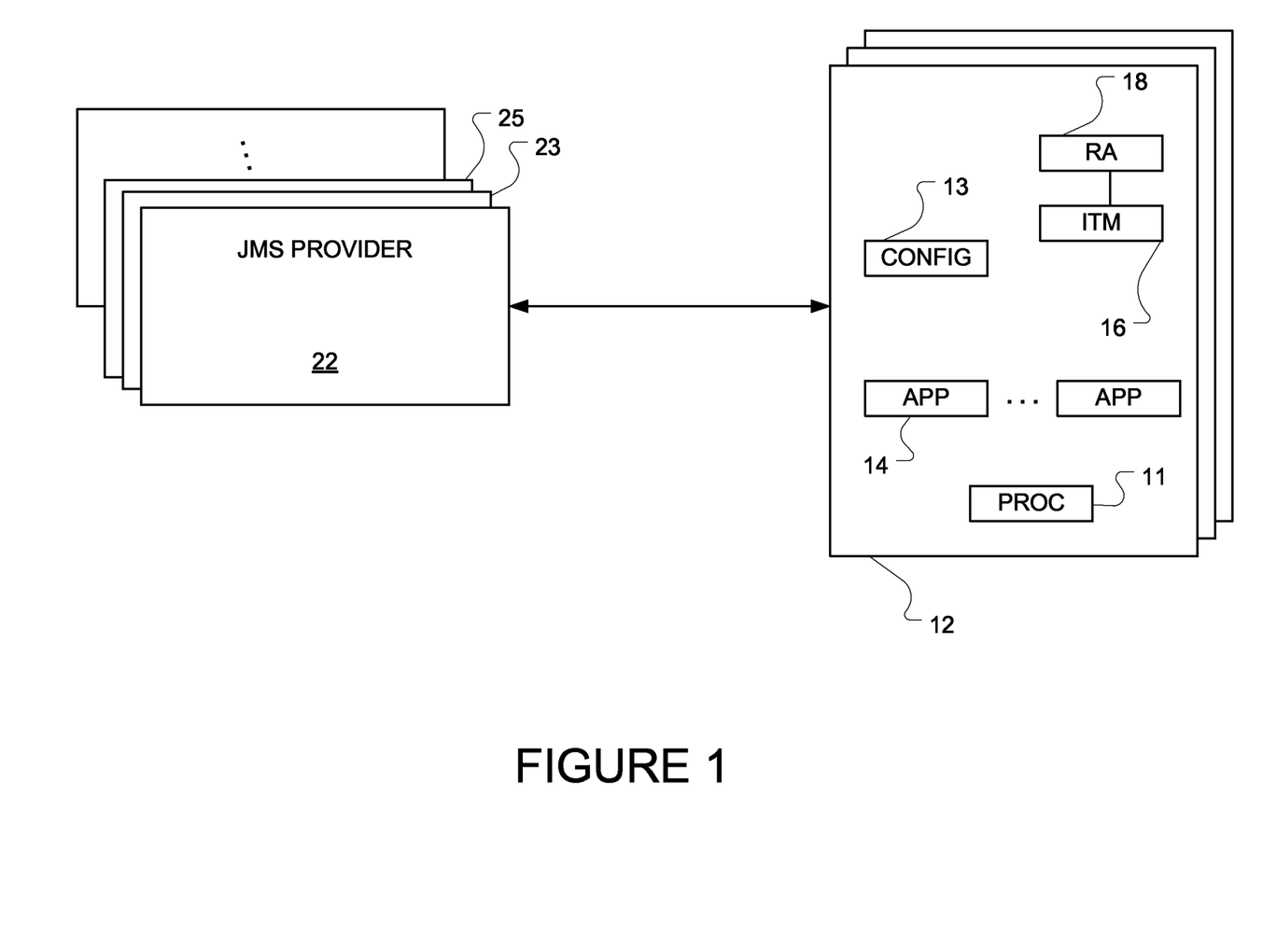
FIG. 1 shows an embodiment of an enterprise information system using JMS.

FIG. 1 shows an embodiment of a Java Message Service and a client application server. As the term is used here, an application server is a server that manages connections for applications running on the server. An application is a program, in this case written in the Java programming language, operating on a server to perform operations to complete tasks, typically in the form of code executable by the processor 11. These tasks may be part of a transaction, which may also be referred to as a unit of work. The transaction may involve several steps or tasks. Each of these tasks may also require messaging between the systems.

Generally, the application server will have deployed with it a transaction manager (TM) to manage the transactions and a resource adaptor (RA) or connector to provide the interface to the messaging system. One should note that the term resource adapter and connector as used here mean the same thing. The resource adapter will generally comply with the JAVA™ Connector Architecture (JCA). Most of the focus of this particular discussion will be on the resource adapter. With the development of JAVA™ 2 Enterprise Edition (J2EE™) 1.4, version 1.5 of the JCA became available. This connector provides some universal or generic connector capabilities that allow application servers to interact with several different Enterprise Information Systems including JMS providers.

Even with the standardized interface, most application server providers develop their own proprietary connectors, or resource adapters, because the JCA generic architecture does not cover many of the proprietary features. The resource adapters are generally provided through a .rar file (resource adapter archive). If the application server provider makes changes to their application servers, the .rar file needs to be recoded, recompiled and redeployed. The resource adapters provide access to resources outside the application server. The resource of interest here is a JMS.

However, employing the embodiments discussed in co-pending application, it is possible to provide a resource adapter that is truly generic to the application server and the JMS, regardless of provider. However, there may be some proprietary features of a particular JMS provider that may require special handling. The embodiments here provide a way to handle the proprietary features and even update the resource adapter to handle new proprietary features 'on the fly' or as they are discovered. As used here, the term proprietary feature means a JMS call that invokes a particular process or handling that is unique to a particular JMS provider. For ease of discussion, a particular feature may be used as an example, with the understanding that the feature is intended only as an example and not intended to limit the scope of the embodiments.

For example, if an application server instance such as 12 is involved in a transaction, such as a customer ordering an item from a web site, the application 14 could be the user interface through which the customer identifies the item to be purchased. The application 14 would then send a message to another application that manages inventory for a particular type of product to inquire as to whether the product is available. The application that handles the product may reside on the application server (app server) 12, or may reside on another application server within a cluster of application servers. Clustering allows multiple servers or server instances to act like a single system and provide high availability and faster processing of tasks.

Alternatively, the application that handles the product may reside on a different application server. The interaction between the different applications is typically handled by a messaging system, more particularly by instances of a Java Message Service (JMS). In the embodiments discussed here, the JMS provider 22 consists of a cluster of JMS servers including JMS servers 23 and 25. The applications on the app server have no information as to the clustering of the JMS provider servers. The application server has residing upon it a resource adapter (RA) 18, also called a connector, which interacts with the cluster.

Generally, the resource adapter deployed on an application server is specific to a particular JMS provider. Most applications that send messaging requests to the resource adapter do so in accordance with a standardized message format. Similarly, the resource adapter will typically be structured in accordance with the JAVA™ Connector Architecture (JCA). However, different JMS providers implement the JCA used on their side of the transaction differently, so typically the resource adapter used will be specific to a particular JMS provider. The applications have no visibility of this, but the application server will.

It is possible, using the embodiments described here, to deploy a resource adapter, such as RA 18 in FIG. 1, that is generic to the JMS providers and still allow the JMS provider to have unique features. As will be described here and in the related applications, the RA 18, the ITM 16 and the configuration file 13 may be provided as a 'bundle' to the application server provider. The ITM 16 is an Interposed Transaction Manager that manages transaction related tasks, which may or may not be associated with messages. This allows the application server, regardless of the creating entity or application server vendor, to communicate with the JMS system, regardless of the JMS creating entity or vendor. The configuration file may be an XML file or other type of control file that allows the resource adapter to be updated without having to be recoded, recompiled and redeployed.

Figure 2:
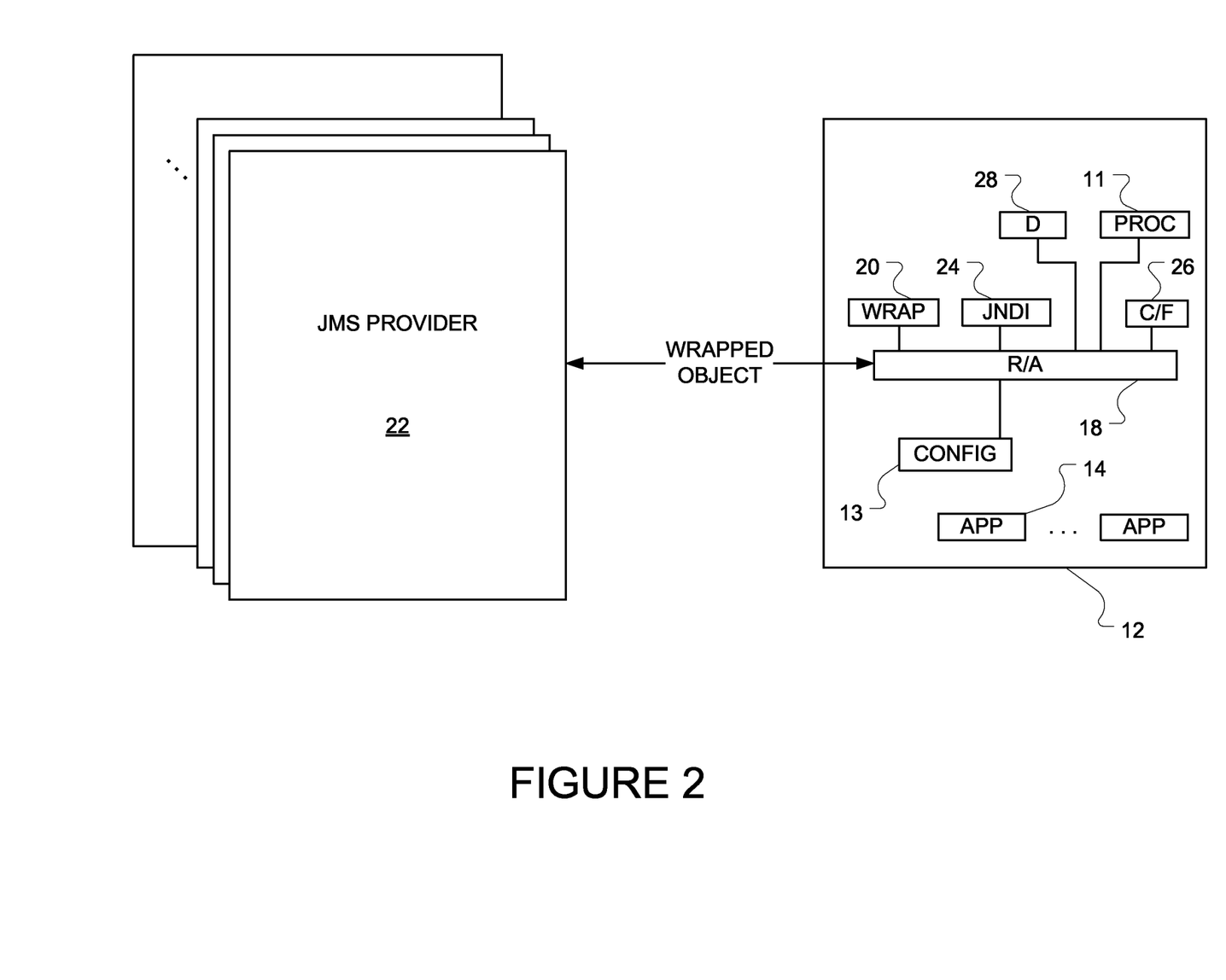
FIG. 2 shows a more detailed view of an enterprise information system using JMS.

FIG. 2 shows a more detailed embodiment of the application server 12. The application server has deployed upon it the resource adapter 18, and the configuration file 13, which may consist of an eXtended Markup Language (XML) file. One of the unique aspects of the embodiments here is that the configuration file can be updated that in turn updates the resource adapter without requiring the recoding, recompiling and redeploying the resource adapter.

When an application such as 14 on the application sends in a call or request to the resource adapter, it may be an administrative or operational call. Administrative requests may involve accesses to the connection factory for setting up a particular connection, managing size limits in a database in the system, name filtering of subscribers names, which may or may not be JAVA™ calls, etc. Operational requests may include defining a destination that is a subset of subscribers of a particular destination, message or operation ordering, as well as less message-oriented tasks, such as driving solid state disk (SSD) drives, etc.

The resource adapter 18 has access to a Java Name Directory Interface (JNDI) 24 that allows applications to access the connection factory 26 and destination 28. The resource adapter also accesses a wrapper library 20 to 'wrap' or encapsulate the request, also referred to as a call or an object, in code. The code typically is deployed to allow the resource adapter to interact with any JMS provider. However, if the JMS provider has some proprietary features, the wrapper will preserve any information contained in the request and pass it onto the JMS system for further transmission. This process is shown in more detail in FIGS. 3 and 4.

The following discussion includes an example of some proprietary features added into the Resource Adapter's capabilities. This example is merely to aid in the understanding of the embodiments and is not intended to limit the scope of the embodiments. No such limitation should be inferred.

When a third party JMS provider creates new, proprietary operational or administrative features as public methods of public interfaces and provides to customers a JMS implementation updated to include those new features, customers may update the RA themselves. This allows the customer code that uses the RA to access the new features without the RA provider having to generate and provide a new RA. It is also possible that the third party JMS provider could provide the update, but in either case, the process is very similar. The rest of the discussion will assume that a customer is performing an update, with the understanding that the update could be provided by any party other than the JMS provider.

Figure 3:
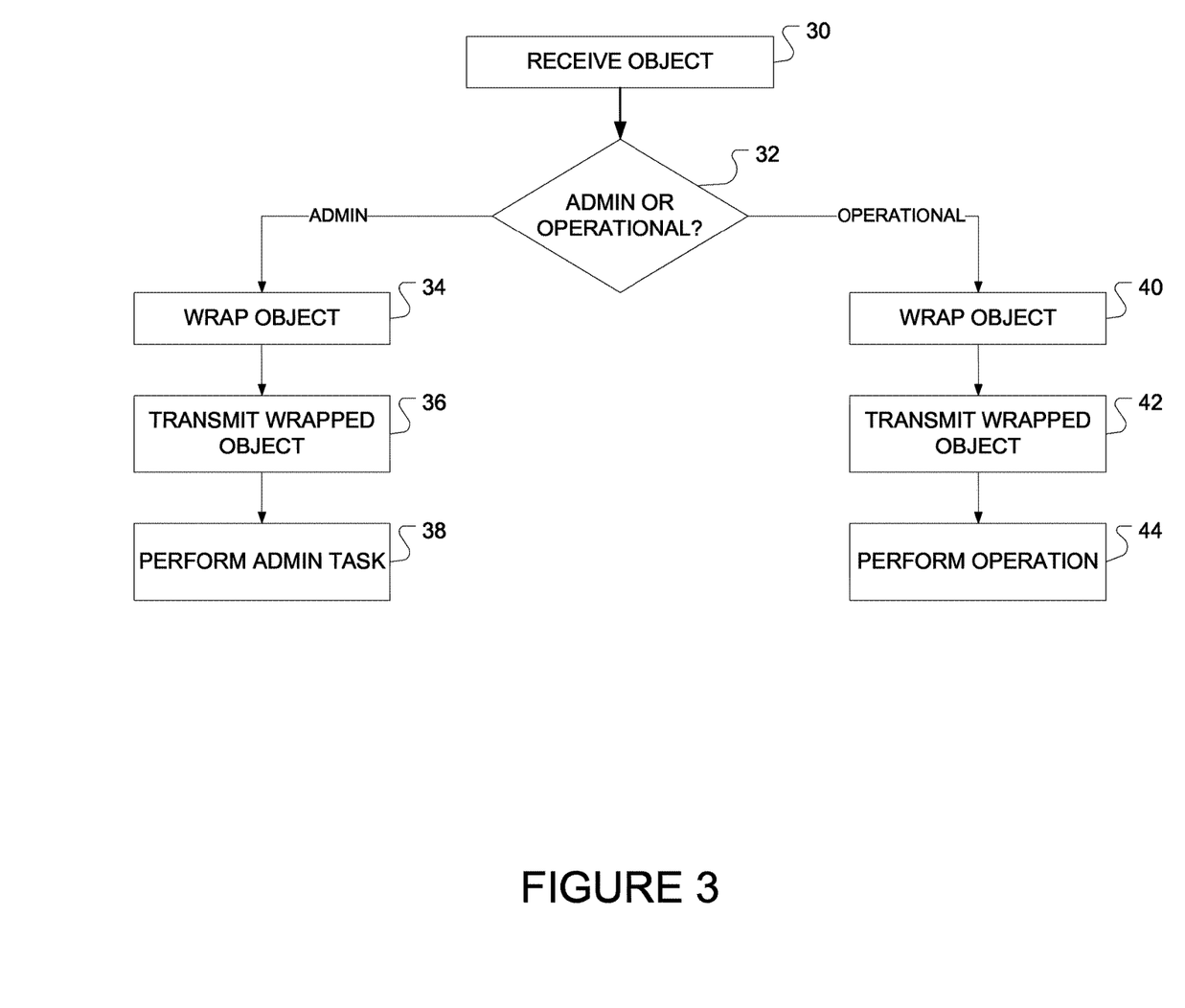
FIG. 3 shows a flowchart of an embodiment of a method of handling proprietary features in a JMS system.

In FIG. 3, the resource adapter receives an object at 30. The object may be administrative or operational at 32. Administrative objects may involve initial operations, such as establishing particular resources in the system, such as the SSDs, as part of the system. The administrative object is then wrapped with the appropriate wrapper at 34 and transmitted at 36. The administrative task contained in the administrative object is then performed at 38. If the object is operational, which may include messaging operations or other types of operations, the object is again wrapped in the appropriate wrapper at 40 and then transmitted at 42. The operation contained in the object is then performed at 44.

Figure 4:
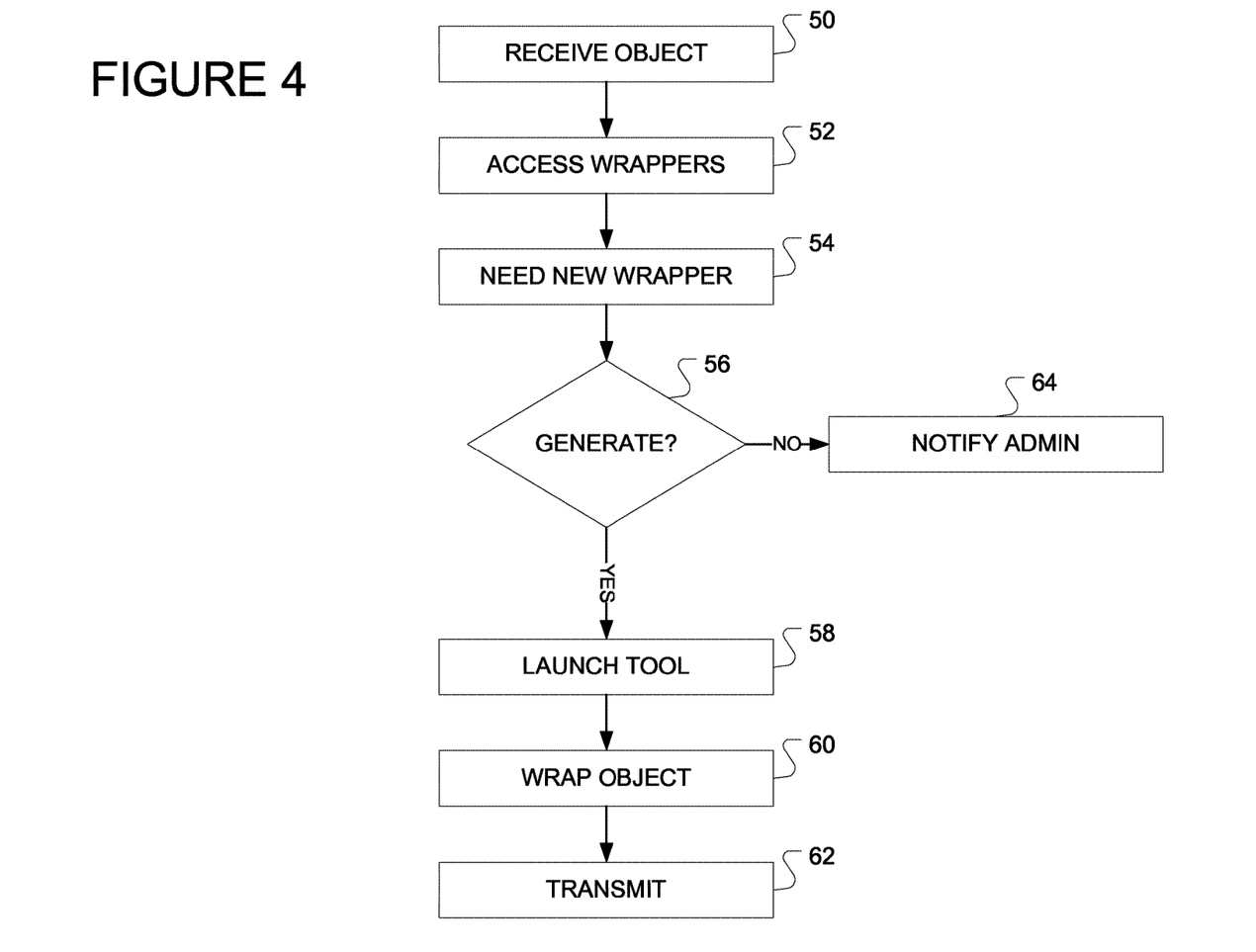
FIG. 4 shows a flowchart of another embodiment of a method of handling proprietary features in a JMS system.

For purposes of this discussion, one of three situations may exist. As set out in the discussion related to FIG. 3, the appropriate wrapper may exist and be documented in the configuration file. Alternatively, the system may provide the ability to generate a new wrapper and update the configuration file in real time. In yet another possible scenario, the system may not be able to generate the appropriate wrapper. FIG. 4 shows a flowchart for addressing the last two situations.

Similar to the process of FIG. 3, the resource adapter receives an object at 50. At 52, the resource adapter accesses wrapper library. If the appropriate wrapper is not available, the resource adapter determines that a new wrapper is needed at 54. The resource wrapper determines if it can generate the wrapper at 56, using a dynamic wrapper generation and configuration tool that is the subject matter of the related application. If the tool can generate the wrapper, it is launched at 58, wraps the object at 60 and forwards the object at 62. If the tool cannot generate the wrapper, the system notifies an administrator at 64 or other entity that the feature cannot be used in the system.

As an example, assume an application needs to support an extended (multi-step) stateful/persistent client interaction. For core functionality, resource reclamation, and/or security reasons, it has been determined that the application should timeout such extended interactions after a period of time or inactivity. For example, assume there is a price quoting system in a volatile market. The customer may request a quote that is only valid for a specific amount of time, for example 90 seconds. If the customer issues a purchase request within the time period, the purchase would be for the quoted price. If the client does not place the order within time period, the price quote is no longer valid and discarded.

The application developers identify the following requirements for the expiration mechanism to be used. The mechanism must be reliable; it should never fail to be triggered. The mechanism must be persistent in that it must function across server restarts. In order to be efficient, the mechanism must be targeted. When the expiration mechanism triggers it should indicate which client's interaction is potentially expired so that the application does not need to examine every client at every possible expiration time. Similarly, when a client may have multiple concurrent interactions (quotes in this case), the message should identify the specific interaction so not all interactions for a given client need be examined. From the application's perspective, the mechanism should be simple. The application should be able to leverage some systems which will handle most or all of the requirements set out above on behalf of the application, rather than the application developers having to embed significant amounts of complex and error-prone code directly implementing all of the above requirements in the application itself.

In the above example, the application developers identify deferred delivery in a persistent messaging system as a mechanism that meets the above requirements. In the quote example, when the quote is issued, the system sends a message containing the client identity and interaction/quote identity. The message should be sent with delivery deferred such that the message will not be delivered until at least 90 seconds into the future. Upon receipt of each such message, the system looks up the client and the interaction identified by the message. If the quote has not already been exercised, the system causes it to expire and release any resources it was using.

The JMS provider already in use by the application has recently added a deferred delivery feature, allowing a time to be associated with each message sent, where the message sent will not be delivered until that time or later. The MessageProducer classes provided by the JMS provider implement the public interface provider.jms.PMessageProducerIntf that includes the method voidsetEarliestDeliveryTime (long time). The customer code uses this feature by obtaining a message producer, by calling javax.jms.Session.createProducer. The customer code then casts that message producer to provider.jms.PMessageProducerIntf, and calling the setEarliestDeliveryTime method on the message, and sending the message, such as by calling javax.jms.MessageProducer.send. The 'provider' and prefix 'P' in PMessageProducerIntf refer to the provider's name, so are generic to whatever provider is used.

However, in order to integrate the JMS provider into their application server, the customer is using a different provider's Resource Adapter. This means that the customer code does not invoke methods directly on the JMS provider, but instead invokes methods on the Resource Adapter that then invokes the JMS provider as appropriate. Assuming that the RA was shipped by the RA provider before the JMS provider added the deferred delivery feature, then the shipped RA does not implement setEarliestDeliveryTime, and consequently the above customer code sequence would fail when run against the shipped RA binaries.

The customer can rectify the above problem by having the RA implement the new method and the provider.jms.PMessageProducerIntf interface for all JMS message producer types. The customer accomplishes that by running a wrapper generation tool, provided by the RA provider, with the following command line parameters:

| | |
|---|---|
| -messageproducer | provider.jms.PMessageProducerIntf |
| -queuesender | provider.jms.PMessageProducerIntf |
| -topicpublisher | provider.jms.PmessageProducerIntf. |

If the customer has never generated wrappers for this provider's interface, and if the RA provider has not provided the config file for this JMS provider that includes support for the interface, then the customer will need to add the above config before running the tool. If the customer has never generated wrappers for the provider.jms.PMessageProducerIntf interface and if the RA provider has not provided config for the JMS provider that includes support for the provider.jms.PMessageProducerIntf interface, then the customer will need to add the above config before running the tool. If the wrapper tool has already been configured to support the provider.jms.PMessageProducerIntf interface, then all the customer needs to do to get support for the setEarliestDeliveryTime method is rerun the tool without making any config changes.

Assuming the wrapper generation tool is configured to use a wrapper class prefix of "P", the above configuration affects the generation of the following files: PMessageProducer.class, PQueueSender.class and PTopicPublisher.class. The above newly generated .class files, in addition to implementing the standard javax.jms.* message producer interfaces, will also implement the provider.jms.PMessageProducerIntf interface along with the setEarliestDeliveryTime method. The customer code sequence given previously, which would fail when run against the original shipped Resource Adapter binaries, will work when run against the newly generated binaries (.class files).

When the wrapper generation tool is run, the provider.jms.PMessageProducerIntf interface, and any interfaces from which it derives, must be in the class path. That is because the wrapper generation tool inspects the provider.jms.PMessageProducerIntf interface and other JMS provider classes as needed in order to determine: the interface hierarchy to locate all inherited public methods; the methods directly and inherited by the message producer interface; and for each method, the types of method parameters, if any; and the type of return value, if any.

The wrapper generation tool then uses that information to augment the Resource Adapter class implementing the corresponding javax.jms.* interface to also implement any specified public interfaces, such as provider.jms.PMessageProducerIntf and all of the methods of those interfaces, such as setEarliestDeliveryTime. When customer code invokes this generated code, it does so using Resource Adapter objects such as connections, sessions, producers, consumers, messages, etc. The generated code unwraps the Resource Adapter object obtaining the corresponding JMS provider object, before invoking the underlying method implementation provided by the JMS provider. When the underlying method implementation provided by the JMS provider is declared to return a value of one of the types wrapped by the Resource Adapter, such as connections, sessions, producers, consumers, messages, etc., the generated code wraps the returned object such that what is returned to the customer code is a Resource Adapter object. Operations may be performed by non-generated code for standard javax.jms.* methods. This may involve verifying that a connection/session is still open and throwing an exception if it is not.

The above is an example of an operational proprietary feature. In another example, the proprietary feature may be administrative. The following example demonstrates the updating of an administrative proprietary feature. An existing application performs a variety of operations built on top of JMS. The performance of one of the operations has become more economically significant for the customer, so the customer would like to prioritize that operation above the others. The JMS provider the customer is using ("Provider") provides multiple means to set JMS priority, both the JMS standard means, that is by the javax.jms.MessageProducer interface which sets JMS priority either for a single message send or for all subsequent message sends using the given MessageProducer and non-standard means by a proprietary provider.jms.PDestinationIntf interface implemented by all Provider javax.jms.Destination objects. The interface includes a setPriorityOverride method which overrides JMS priority for all message sends to the given destination. Though any of those mechanisms could in theory be used to change the priority of the JMS messages for the given operation, the customer does not want to modify the application code and would prefer to set the new priority via configuration changes only.

The JMS provider includes a minimal JNDI implementation which allows its destination objects, JAVA™ objects implementing javax.jms.Destination and provider.jms.PDestinationIntf to be looked up. Those destination objects are JAVA™ Beans where one of the properties is the priority override. When the priority override is set on such a destination object, it applies to all message sends using that destination object or copies of that destination object created via serialization after the property was set. The property is not stored in the JMS provider's persistent storage, and setting the property on one destination object does not affect other destination objects for the same physical destination in the JMS provider's persistent storage.

For example, if two different JVMs look up the same destination in the JMS provider's JNDI, they get two different destination objects, which they are then free to configure with two different priority override values. In that case, messages sent from one JVM to the physical destination have one priority, and messages sent from the other JVM to the same physical destination have a different priority. Subsequently, even if the customers app server supports both importing a foreign JNDI and interactively invoking methods, such as setPriorityOverride on objects within the foreign JNDI, that would not be an acceptable solution as not only would the customer need to do this on every app server, but such configuration would be lost any time an app server was restarted.

In contrast to the situation with JMS destination objects in foreign JNDI services, support for configuration of properties on Resource Adapter admin objects such as destinations is provided by all app servers implementing the J2CA standard. However, assuming that the Resource Adapter was shipped by the RA provider before Provider added the priority override feature, then the shipped Resource Adapter destination objects do not implement setPriorityOverride. Consequently, this standard J2CA support for configuring Resource Adapter destinations is not of any help so long as the customer is using the Resource Adapter binaries exactly as shipped.

The customer can bridge the gap by having the Resource Adapter implement the new method and the provider.jms.PDestinationIntf interface for all administrative JMS destination types. The customer accomplishes that by running the wrapper generation tool provided by the RA provider with the following command line parameters:

```
-queueadmin provider.jms.PDestinationIntf
-topicadmin provider.jms.PDestinationIntf.
```

The customer is free to have the Resource Adapter go ahead and implement the new method and interface for all destination object instances, not just admin objects, by also including the following command line parameters, though it is not necessary for this example:

```
-queue           provider.jms.PDestinationIntf
-topic           provider.jms.PDestinationIntf
-temporaryqueue  provider.jms.PDestinationIntf
-temporarytopic  provider.jms.PDestinationIntf.
```

If the customer has never generated admin queue/topic wrappers for the provider.jms.PDestinationIntf interface, and if the provider has not provided a configuration that includes support for the provider.jms.PDestinationIntf, then the customer will need to add the above queueadmin/topicadmin config before running the tool. If the wrapper tool has already been configured to support the provider.jms.PDestinationIntf interface for queue/topic admin objects, then all the customer needs to do to get support for the setPriorityOverride method is rerun the tool without making any config changes.

Assuming the wrapper generation tool is configured to use a wrapper class prefix of "P", the above admin queue/topic configuration affects the generation of the following files: PQueueAdmin.class, PQueueAdminInterface.class, PTopic- Admin.class and PTopicAdminInterface.class. If the customer had the tool support the method/interface for all destination types and not just admin destinations, then the generation of the following files is also affected: PQueue.class, PTopic.class, PTemporaryQueue.class and PTemporaryTopic.class. The above newly generated .class files, in addition to implementing the standard javax.jms. * destination interfaces, will also implement the provider.jms.PDestinationIntf interface along with the setPriorityOverride method.

If the customer has never configured the Resource Adapter admin queue/topic wrappers for the provider.jms.PDestinationIntf interface, and if the RA provider has not provided config for Provider that includes support for the provider.jms.PDestinationIntf interface, then the customer will also need to augment the Resource Adapter's ra.xml file to include the following:

```
<adminobject>
    <adminobject-interface>
        provider.jms.ra.PQueueAdminInterface
    </adminobject-interface>
    <adminobject-class>
        provider.jms.ra.PQueueAdmin
    </adminobject-class>
</adminobject>
<adminobject>
    <adminobject-interface>
        provider.jms.ra.PTopicAdminInterface
    </adminobject-interface>
    <adminobject-class>
        provider.jms.ra.PTopicAdmin
    </adminobject-class>
</adminobject>
```

With the newly generated binaries (.class files) and ra.xml config in place, the customer can then use the app-server provided means to configure Resource Adapter destinations to set the priority override property. When the wrapper generation tool is run, the provider.jms.PDestinationIntf interface and any interfaces from which it derives must be in the class path. That is because the wrapper generation tool inspects the provider.jms.PDestinationIntf interface and other JMS provider classes as needed in order to determine: the interface hierarchy to locate all inherited public methods; the methods both directly defined by provider.jms.PDestinationIntf and inherited by provider.jms.PDestinationIntf; and for each method the types of method parameters and type of the return value, if any.

The wrapper generation tool then uses that information to augment the Resource Adapter class implementing the corresponding javax.jms. * interface to also implement any specified public interfaces, such as provider.jms.PDestinatinIntf and all of the methods of those interfaces, such as setPriorityOverride. When app-server configuration, or customer code, invokes this generated code, it does so using Resource Adapter destination objects. The generated code unwraps the Resource Adapter destination object, obtaining the corresponding JMS provider destination object, before invoking the underlying method implementation provided by the JMS provider. Operations performed by generic/non-generated Resource Adapter code for standard javax.jms. * methods, such as lazy lookup of the underlying JMS provider destination object, are also performed by the generated code.

In this manner, the proprietary features of a particular JMS provider can still be deployed, even within the context of a single connector system that applies to multiple JMS providers and multiple application server providers. This reduces the number of situations in which the configuration file needs to be altered or a new wrapper added to the library. In either case, this avoids having to recode, recompile and redeploy the application server used for any particular JMS.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A computer-controlled method of handling proprietary features in a messaging system, comprising:
    receiving an object from a requesting application at a resource adapter on an application server;
    determining, at the resource adapter, that the requesting application, through the object, invokes at least one proprietary feature of a messaging system provider, wherein the at least one proprietary feature is a process unique to the messaging system provider and does not exist on the resource adapter;
    accessing, using the resource adapter, a wrapper library and wrapping the object in an appropriate wrapper for the messaging system to produce a wrapped object, the wrapper to preserve the at least one proprietary feature;
    transmitting the wrapped object from the resource adapter to the messaging system such that the at least one proprietary feature is preserved; and
    updating a configuration file for the resource adapter such that the resource adapter will recognize the at least one proprietary feature without having to be recompiled, wherein the configuration file documents existing wrappers and is updated in real time to include new wrappers, when the new wrappers are generated.

2. The computer-controlled method of claim 1, wherein the object consists of one of either an administrative object or an operational object.

3. The computer-controlled method of claim 2, wherein the object is the administrative object and the method further comprises performing an administrative task contained in the administrative object.

4. The computer-controlled method of claim 2, wherein the object is the operational object and the method further comprises performing an operation contained in the operational object.

5. The computer-controlled method of claim 1, wherein the accessing the wrapper library comprises determining that the appropriate wrapper does not exist in the wrapper library.

6. The computer-controlled method of claim 5, further comprising accessing a wrapper generation tool to generate the appropriate wrapper.

* * * * *